United States Patent
Mottier

[11] 3,947,085
[45] Mar. 30, 1976

[54] METHOD OF PRODUCING A HOLOGRAM WITH AN ORTHOSCOPIC IMAGE

[75] Inventor: Francois Mottier, Oberrohrdorf, Switzerland

[73] Assignee: BBC Brown, Boveri & Company, Limited, Baden, Switzerland

[22] Filed: Nov. 19, 1974

[21] Appl. No.: 525,066

[30] Foreign Application Priority Data
Dec. 21, 1973  Switzerland.................. 18013/73

[52] U.S. Cl.................................. 350/3.5; 355/2
[51] Int. Cl.² ..................................... G03H 1/20
[58] Field of Search................ 350/3.5; 355/2

[56] References Cited
OTHER PUBLICATIONS

Kimura, Oyo Buturi, Vol. 42, No. 6, June 1973, pp. 587–595.
Schinella, Optical Spectra, July 1973, pp. 27, 28, 30, 32, 33, 34.
Jeong et al., Jour. of the Optical Society of America, Vol. 56, Sept. 1966, pp. 1263–1264.
Supertzi et al., Jour. of the Optical Society of America, Vol. 56, Apr. 1966, pp. 524–525.

*Primary Examiner*—Ronald J. Stern
*Attorney, Agent, or Firm*—Oblon, Fisher, Spivak, McClelland & Maier

[57] ABSTRACT

A method of producing a hologram with an orthoscopic, at least partially real image of an object is disclosed. According to the method, the object is recorded on a first hologram and is then reconstructed from this hologram and recorded on a second hologram. In taking the second hologram, solid objects are situated laterally with respect to the light-wave field reconstructing the object from the first hologram, and the solid objects are included in the second hologram. This technique permits reproduction of an image of the object which is viewable over a greater spatial region than would be the case if the laterally situated solid objects were omitted.

2 Claims, 12 Drawing Figures

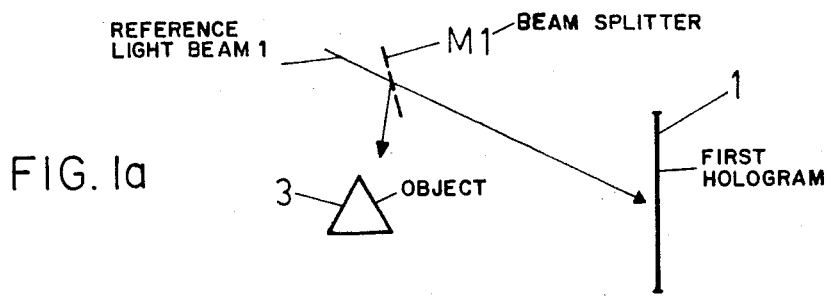
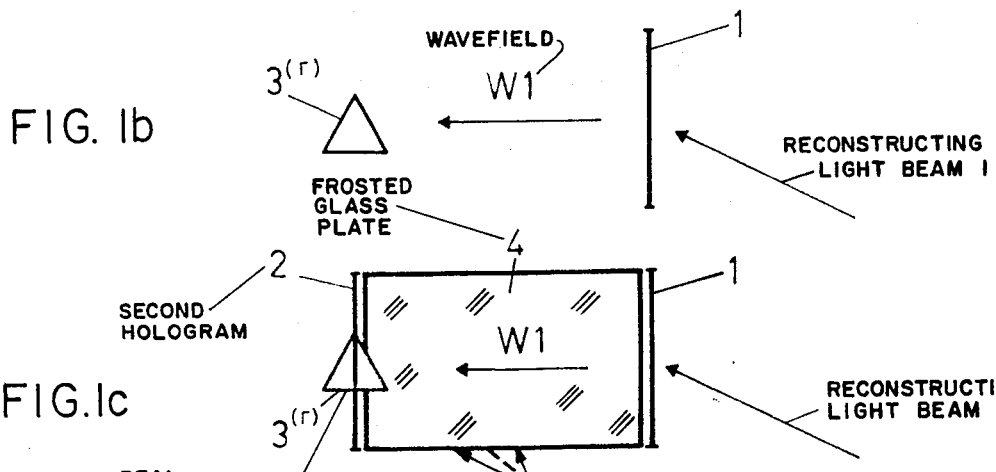
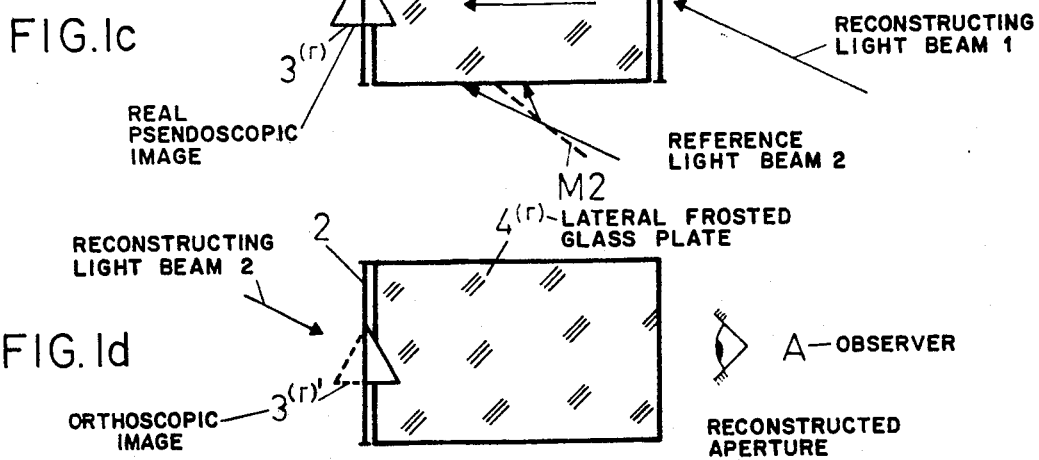
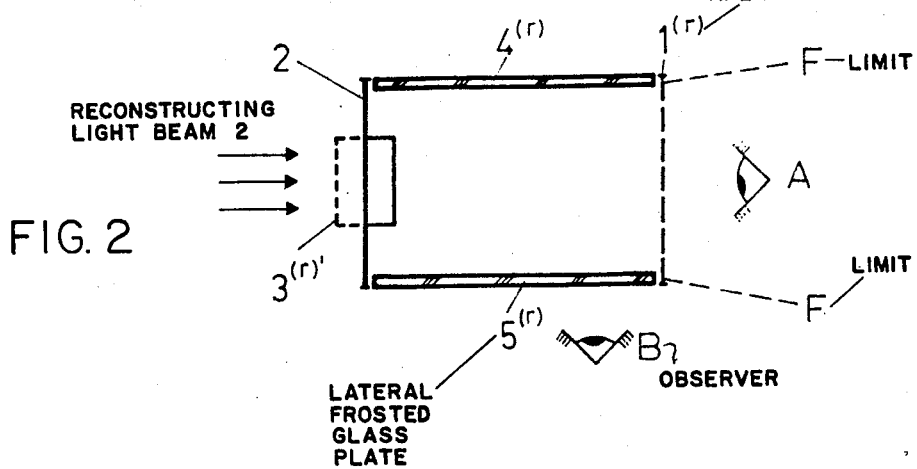

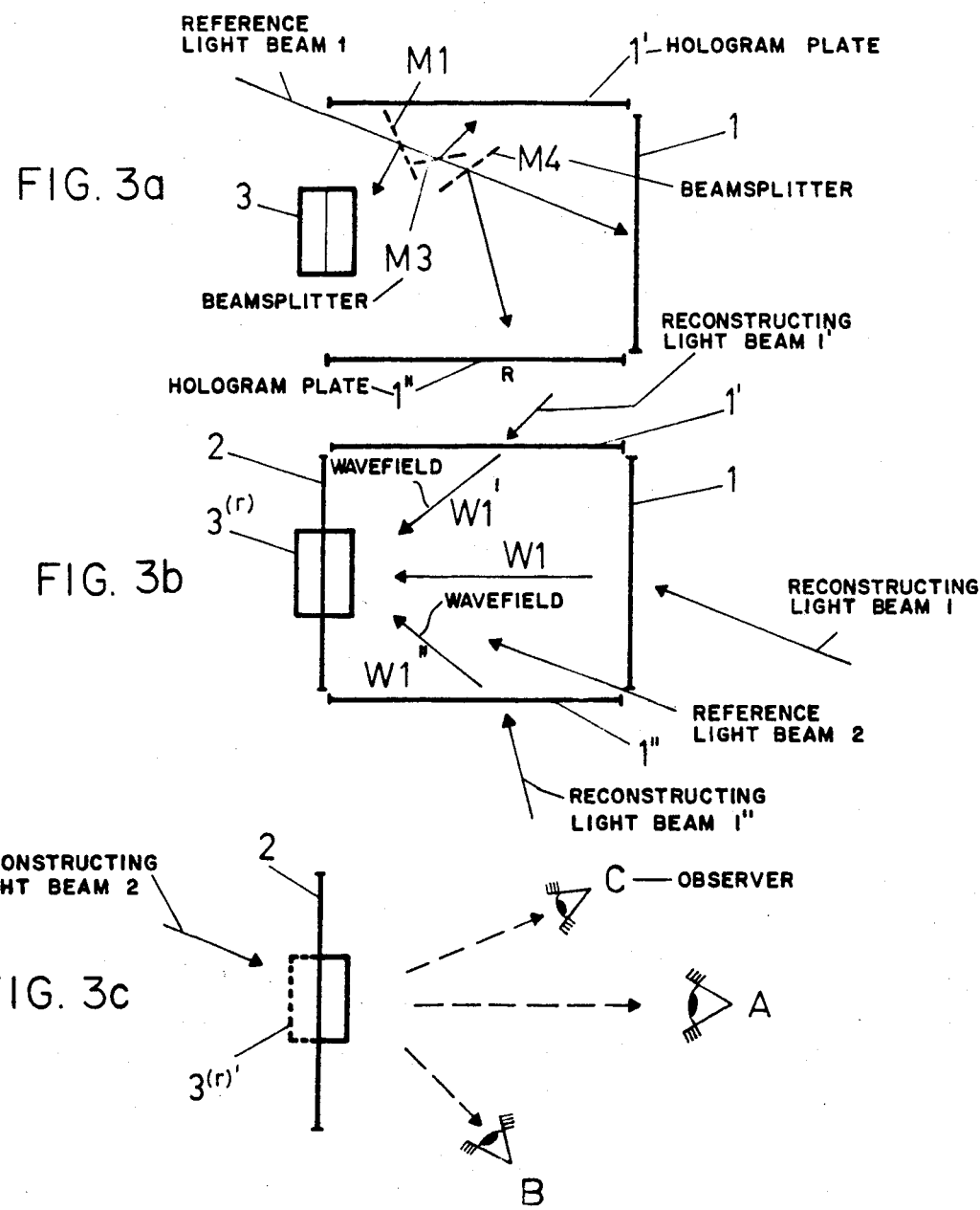

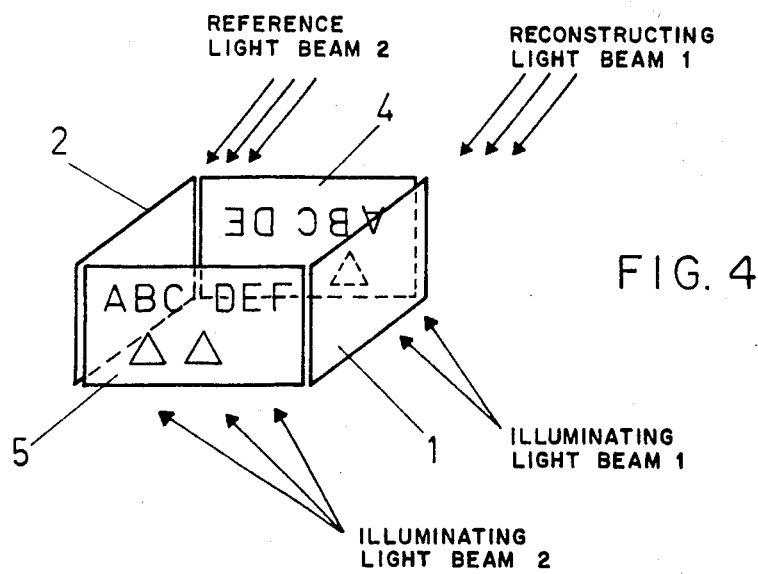
FIG. 4
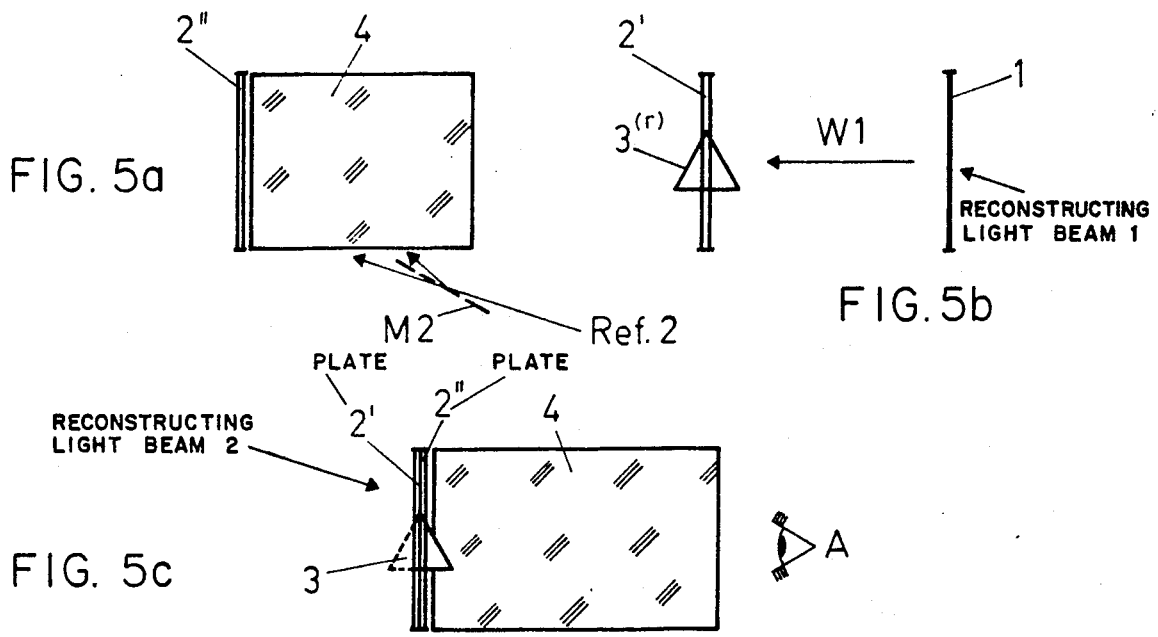
FIG. 5a
FIG. 5b
FIG. 5c

METHOD OF PRODUCING A HOLOGRAM WITH AN ORTHOSCOPIC IMAGE

BACKGROUND OF THE INVENTION

1. Field of the Invention

The present invention relates generally to a method of producing a hologram with an orthoscopic, and at least partially real image of an object, the object being recorded on a first hologram and the reconstruction of the object from this first hologram then being recorded on a second hologram.

2. Description of the Prior Art

A method of the mentioned type is known, e.g. from Appl. Phys. Letters 8, No. 6, March 15, 1966, pp. 146–148. The known method serves to produce real images which are orthoscopic. In ordinary holographic recording and reconstruction the real images are of course pseudoscopic (cf. e.g. "Funktechnische Arbeitablätter", Franzis Verlag Munich, Ot 91 "Holographie", Blatt 2). This sharply reduces the value of the real images although they have a great advantage over virtual images in that every point of the image can be examined as closely as desired, even with a magnifier if necessary. This deficiency is eliminated by the known method.

However the known method still has the drawback for the observer that the real orthoscopic image reconstructed from the second hologram can be viewed by the observer only over a limited angular range determined by the aperture of the first hologram reconstructed by the second hologram. If the observer's optical sensing device, usually his eye, leaves the mentioned angular region, then the image vanishes for no apparent reason.

SUMMARY OF THE INVENTION

Accordingly, it is one object of the present invention to remedy this defect.

Briefly, this and other objects are attained, in accordance with the invention, by including in the second hologram solid objects located laterally with respect to the light wave field reconstructing the object of the first hologram.

The lateral solid objects can advantageously be lettered frosted-glass plates for example, or even hologram plates on which the object and/or another subject has previously been recorded, so that in taking the second hologram the object and/or the other subject is reconstructed by these hologram plates.

In the first case the disappearance of the image of the object upon exceeding the angular range set by the aperture of the first hologram is no longer inexplicable to the observer who now sees the frosted plates framing the image of the reconstructed object. In this case, therefore, the overall field-of-view has become larger, not of course with respect to the object image, but with respect to the total image. This is of great significance particularly when the hologram is shown to lay observers for demonstration or advertising purposes.

In the second case however, when the object has been recorded on the lateral hologram plates there is a genuine physical enlargement of the field-of-view. The field-of-view of the object image is now given by the sum of the apertures of the first hologram and the lateral hologram plates.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1a–1d illustrate the production of a hologram with an orthoscopic, partially real image of the object with frosted glass plates as the lateral objects, the view being from the side, with the individual steps involved denoted by FIGS. 1a–1c and the final reconstruction of the second hologram by FIG. 1d;

FIG. 2 is a top view of the arrangement of FIG. 1d;

FIGS. 3a–3c illustrates the production of a hologram with an orthoscopic, partially real image of the object with hologram plates as the lateral solid objects, in top view;

FIG. 4 illustrates an arrangement for producing a hologram with an orthoscopic, at least partially real image of the object, the lateral solid objects being lettered, frosted-glass plates, shown in perspective; and, FIGS. 5a–5c illustrate the production of a hologram with an orthoscopic, partially real image, a special plate being provided for recording the lateral solid objects at the position of the second hologram.

DESCRIPTION OF THE PREFERRED EMBODIMENTS

Referring now to the drawings, wherein like reference numerals designate identical or corresponding parts throughout the several views, and more particularly to FIG. 1a) thereof, there is shown an object 3 illuminated by a coherent reference light beam 1 diverted by a beam-splitter M1. The portion of the coherent light beam Ref. 1 transmitted by beam-splitter M1 serves as the reference light for the first hologram 1. In the manner shown there is thus recorded at the position of the first hologram 1 a hologram of object 3.

In FIG. 1b) the object 3 of the first hologram is reconstructed by means of the coherent reconstructing light beam 1. As can be seen reconstructing light beam 1 travels parallel to reference light beam 1 in the opposite direction. The light-wavefield W1 arising after passage of reconstructing light beam 1 through the first hologram 1 then produces the real pseudoscopic image $3^{(r)}$ of object 3.

As shown in FIG. 1c) a photographic plate is now placed at the position of image $3^{(r)}$ of object 3 to take the second hologram 2. The plate is oriented with respect to the reconstructed image $3^{(r)}$ of object 3 so that one part of the image lies behind the plate and the other part, in front. The plate could also be positioned, however, so that the image $3^{(r)}$ of object 3 does not intersect it, preferably in FIG. 1c) with the plate to the left of $3^{(r)}$. To the sides of the wavefield W1 are provided two frosted-glass plates 4 and 5, of which however only frosted-glass plate 4 is shown. For taking the second hologram 2 the image $3^{(r)}$ of object 3 is reconstructed from the first hologram by means of the reconstructing light beam 1, while the coherent reference light beam 2 falls on the plate at the location of the second hologram 2. The frosted-glass plates 4, 5 are likewise coherently illuminated, conveniently, as shown, by means of a portion of the reference light beam 2 diverted by the beamsplitter M2. In FIG. 1d), finally, the reconstructing light beam 2 is incident on the second hologram 2. Reconstructing light beam 2 suitably has again the direction of reference light beam 1. There then arises from reconstruction of the second hologram 2 an orthoscopic image $3^{(r)'}$ of the object 3, of which the part towards the observer A is real and the part away from him is virtual. If the image $3^{(r)}$ in FIG. 1c) were completely outside and to the right of the plate at the position of the second hologram 2, then the image $3^{(r)'}$ would be entirely real. Besides the image $3^{(r)}$ of the object 3, the lateral frosted-glass plates $4^{(r)}$ and $5^{(r)}$ (not shown) are also reconstructed from the second hologram 2.

The significance of the lateral frosted plates 4 and 5 or $4^{(r)}$ and $5^{(r)}$ is particularly easy to understand from FIG. 2.

There the frosted plates 4 and 5 recorded on the second hologram 2 as $4^{(r)}$ and $5^{(r)}$, as well as the object 3 recorded as orthoscopic image $3^{(r)'}$ are reconstructed by means of the reconstructing light beam 2.

While now without the side panels $4^{(r)}$ and $5^{(r)}$ any image formed from the second hologram 2 suddenly disappears for observer A as soon as he moves outside the dashed limits set by the reconstructed aperture $1^{(r)}$ of the first hologram 1, with the frosted plates $4^{(r)}$ and $5^{(r)}$ present, these remain visible even beyond the limits F. Thus even though observer B sees no more of object 3 than without the plates 4, 5, still he has the feeling that object 3 is hidden behind the frosted plates $4^{(r)}$ and $5^{(r)}$ which now fill his field-of-view. This is very important psychologically, especially if the hologram is used for advertising purposes. Since observer A even after crossing the bounds F still sees, as observer B, a holographic reconstruction, viz. that of the frosted plates 4, 5, his field-of-view is thus enlarged.

In FIG. 3 the frosted plates 4, 5 of FIGS. 1 and 2 are replaced with hologram plates 1', 1''.

In FIG. 3a) the object 3 is then recorded not only on the first hologram 1 but also on the hologram plates 1', 1''. For this purpose the plates 1', 1'' are also illuminated with the coherent reference light diverted from reference light beam 1 by means of beamsplitters M3, M4.

The recording of the second hologram then proceeds in accordance with FIG. 3b). The directions of the reference light beam 1, wherever this was incident on the first hologram 1 and the hologram plates 1', 1'', are reversed so that a pseudoscopic reconstruction of the object 3 as image $3^{(r)}$ on the second hologram 2 is produced by the reconstruction light beams 1 and 1'. However, the image $3^{(r)}$ of the object 3 on the second hologram 2 is produced not only by the light-wavefield W1 resulting from the passage of the reconstructing light beam 1 through the first hologram, but additionally by the wavefields W1' and W1'' of the reconstruction light beams 1' and 1''.

This has, in a reconstruction of the second hologram 2 as in FIG. 3c) with the reconstructing light beam 2, which preferably has again the direction of reference light beam 1 in FIG. 1a), the important consequence that the observer A can now view the orthoscopic, real image $3^{(r)'}$ of object 3 in front of the second hologram 2 even from positions B and C.

In this embodiment, then, the physical viewing region of the reconstructed, orthoscopic image $3^{(r)'}$ is greatly enlarged in comparison with the region within the boundaries F in FIG. 2.

The box-like arrangement of the plate of the first hologram 1 and the frosted plates 4 and 5 with letters and symbols on them shown in FIG. 4 permits an especially practical recording of the second hologram 2, and thus the copying of the original hologram in order to convert the pseudoscopic image of the object into an orthoscopic one with lateral framing. The method of recording is that described with reference to FIG. 1c). There merely are provided special coherent illuminating light beams 1 and 2 for the frosted plates 4 and 5, while the coherent illumination of the frosted plates in FIG. 1c) was split off from the reference light beam Ref. 2.

In FIG. 5 the side panels 4, 5 and the reconstructed image $3^{(r)}$ of the object 3 produced at the position of the second hologram 2 by means of the first hologram 1 are recorded independently of one another on two separate plates 2'' and 2' [FIG. 5a) and 5b)]. For viewing, i.e. reconstruction of the second hologram as in FIG. 5c), the two plates are superimposed so that the same image as in FIG. 1d) is produced. The arrangement of FIG. 5 has the advantage that it is only necessary to record once the lateral optical screen produced by the frosted plates 4, 5 or the like as in FIG. 5a). Holograms of various objects can then always be taken without the side panels. Only upon reconstruction of the second hologram by means of the reconstructing light beam 2 as in FIG. 5c) does the optical lateral screen again appear.

As already pointed out, in the method described with reference to FIG. 3 it is of course not absolutely necessary to record the same objects 3 on the hologram plates 1' and 1'' as on the first hologram 1. Other subject can be recorded on the plates 1' and 1'', which would then form the lateral optical screen in a reconstruction as in FIG. 3c).

Obviously, numerous modifications and variations of the present invention are possible in light of the above teachings. It is to be understood therefore that within the scope of the appended claims, the invention may be practiced otherwise than as specifically described herein.

What is claimed as new and desired to be secured by Letters Patent of the United States is:

1. A method of producing a hologram with an orthoscopic at least partially real image of an object, wherein the object is recorded on a first hologram and is then reconstructed from this first hologram and recorded on a second hologram, comprising the steps of:

situating solid objects laterally with respect to the wave field produced when said object is reconstructed from said first hologram by using frosted-glass plates provided with selected symbols as said solid objects, and, taking said second hologram so as to include said solid objects and said object reconstructed from said first hologram, the step of taking including the step of positioning the plate for said second hologram at the position of said object reconstructed from said first hologram such that part of said reconstructed object lies behind and part in front of said plate.

2. A method as in claim 1 wherein each frosted glass plate has at least two edges, one edge being substantially contiguous to said second hologram and the other edge being substantially contiguous to said first hologram to form a box-like configuration.

* * * * *